United States Patent [19]
Hoeks et al.

[11] Patent Number: 6,087,468
[45] Date of Patent: *Jul. 11, 2000

[54] METHOD OF BRANCHING AND CROSS-LINKING A POLYCARBONATE RESIN

[75] Inventors: Theodorus L. Hoeks, Bergen op Zoom; Adrianus A. M. Kusters, Chaam, both of Netherlands; Ye-Gang Lin, Evansville, Ind.; Patrick J. McCloskey, Watervliet, N.Y.; Raphael Mestanza, Kuntzig, France; Pin-pin Wu, Evansville, Ind.

[73] Assignee: General Electric Company, Pittsfield, Mass.

[ * ] Notice: This patent is subject to a terminal disclaimer.

[21] Appl. No.: 08/954,458

[22] Filed: Oct. 20, 1997

[51] Int. Cl.⁷ ..................................................... C08G 64/00
[52] U.S. Cl. ........................................... 528/196; 528/198
[58] Field of Search ....................................... 528/196, 198

[56] References Cited

U.S. PATENT DOCUMENTS

| | | | |
|---|---|---|---|
| 2,999,835 | 9/1961 | Goldberg | 528/196 |
| 3,027,814 | 4/1962 | Schnellmann | 528/196 |
| 3,028,365 | 4/1962 | Schnell et al. | 528/196 |
| 3,030,331 | 4/1962 | Goldberg | 528/196 |
| 3,153,008 | 10/1964 | Fox | 528/196 |
| 3,169,121 | 2/1965 | Goldberg | 528/196 |
| 3,275,601 | 9/1966 | Schnell et al. | 528/196 |
| 3,334,154 | 8/1967 | Kim | 528/196 |
| 3,489,716 | 1/1970 | Calkins | 528/196 |
| 3,839,247 | 10/1974 | Bialous et al. | 528/196 |
| 3,915,926 | 10/1975 | Wambach | 528/196 |
| 4,138,379 | 2/1979 | Scott et al. | 528/196 |
| 4,188,314 | 2/1980 | Fox et al. | 525/433 |
| 4,286,083 | 8/1981 | Kochanowski | 528/173 |
| 4,330,669 | 5/1982 | Ikeguchi et al. | 528/289 |
| 4,395,062 | 7/1983 | F'Geppert | 292/64 |
| 4,487,896 | 12/1984 | Mark et al. | 525/439 |
| 4,621,132 | 11/1986 | Quinn et al. | 528/194 |

FOREIGN PATENT DOCUMENTS 0 378 858 A2  7/1990  European Pat. Off. .
2913185  10/1979  Germany .

*Primary Examiner*—Terressa Mosley-Boykin

[57] ABSTRACT

The disclosure describes reacting a multi-functional phenolic or carboxylic branching agent with a transesterification catalyst to form an organic salt prior to reactive extrusion of said organic salt branching agent with linear polycarbonate resin as a means to dramatically increase the efficiency of the branching agent in the preparation of branched polycarbonate.

16 Claims, No Drawings

METHOD OF BRANCHING AND CROSS-LINKING A POLYCARBONATE RESIN

BACKGROUND OF THE INVENTION

1. Field of the Invention

The invention relates to synthetic polymeric resins and more particularly to a branching agent and its use to branch polycarbonate resins.

2. Brief Description of Related Art

Polycarbonates are well known polymers which have good property profiles, particularly with respect to impact resistance, electrical properties, dimensional rigidity and the like. These polymers are generally linear, but can be made with branched sites to enhance their properties in specific ways. Low levels of branching are generally incorporated into the resin by co-polymerizing into the polymer backbone a tri or higher functional reagent to yield a thermoplastic polycarbonate resin with enhanced rheological properties and melt strength which make it particularly suitable for such types of polymer processing procedures as the blow molding of large, hollow containers and the extrusion of complex profile forms.

Sufficiently higher levels of branching sites in the resin will cause resin chains actually to join to each other to form partially or fully crosslinked resin networks which will no longer be thermoplastic in nature and which are expected to exhibit enhancements, over corresponding linear resins, in certain physical properties and/or in their resistance to abusive conditions, such as exposure to organic solvents. A wide variety of means have been employed to produce crosslinking in polycarbonate resin. These generally involve the incorporation of a suitably reactive chemical group either into the resin chain at its time of manufacture or as an additive to the resin after manufacture, or both. These reactive groups and the reactions they undergo are generally dissimilar from those characteristic of polycarbonate resin itself and are therefore prone to have detrimental side effects on the physical and/or chemical properties of the polymer. The conventional test used to judge the success of these means for crosslinking is to observe the formation of gels due to the crosslinked material when a resin sample is mixed with a solvent, such as methylene chloride, in which normal linear polycarbonate resin is highly soluble.

The major advantage of branched polycarbonate is its relatively high melt strength, or, more particularly, its high ratio of low-shear melt viscosity to high-shear melt viscosity (R*). This high melt strength makes branched polycarbonate uniquely suitable for applications such as blow-molded waterbottles and automobile bumpers, where the structural integrity of the melted parison under the influence of gravity is critical.

At present, branched polycarbonate is produced commercially in an interfacial phosgenation process, using 1,1,1-tris(4-hydroxyphenyl-)ethane, or THPE, as the branching agent. Producing branched polycarbonate in this way has several disadvantages including the need for extensive cleanout of the reactor after a production run and the risk of "gel" contamination of higher melt flow homopolycarbonate products during handling of the polycarbonate powders. It would therefore be advantageous to develop a method of production for branched polycarbonate which would not require the use of the phosgenation reactor and associated powder handling systems.

Previously, attempts have been made to produce branched polycarbonate from a trifunctional phenolic branching agent, such as THPE, and homopolycarbonate using reactive extrusion mediated by a basic transesterification catalyst, such as tetraethylammonium acetate (TEAA) monohydrate, in which all the aforementioned ingredients were admixed prior to melt extrusion. These efforts were unsuccessful, producing material with low melt strength. Recently, branched polycarbonate has been successfully produced via the reactive extrusion method described above using the tetrafunctional phenolic branching agent, 2,2,5,5-tetra-(4-hydroxyphenyl-)hexane, in place of THPE. Unfortunately, this tetrafunctional branching agent is very costly to produce, thus limiting the economic viability of this approach.

The present invention includes a new method to prepare branched or crosslinked polycarbonate resin. This approach involves the use of a branching agent additive to the resin which has structure and reactivity very similar to that of the polycarbonate resin repeat unit itself. Thus, it offers the dual advantages of allowing the branch sites to be incorporated into standard linear polycarbonate resin subsequent to manufacture of the resin and of providing this branching or cross-linking by a method which produces residual structural groups in the final composition which are expected to be physically and chemically compatible with the polycarbonate resin.

The state of the art is represented by the disclosures found, for example, in U.S. Pat. Nos. 4,415,722; 4,474,999; 4,469,861; 4,550,155; 4,621,132; and 5,089,598, all of which are incorporated herein by reference thereto.

SUMMARY OF THE INVENTION

The invention comprises a method of branching and cross-linking a polycarbonate resin, which comprises;

reacting together a branching site generating proportion of a multi-functional phenolic branching agent and a basic transesterification catalyst in the presence of an inert organic solvent;

removing the solvent to separate a reaction product; and melt blending a mixture of the reaction product with a linear polycarbonate resin.

The term "melt blending" as used herein means a homogeneous admixturing of the linear polycarbonate resin and the branching agent while they are in a molten or thermoplastic state, i.e., heated to a condition of plasticity whereupon the resins will flow like a fluid. Advantageously, the temperature is within a range to cause reaction between the polycarbonate and the branching agent, generally a range of from about 300° C. to 400° C., preferably 325° C. to 350° C.

The term "inert solvent" as used herein means an organic solvent for the multi-functional phenolic branching agent, which does not enter into or adversely affect the desired course of the reaction. Representative of inert solvents are methylenechloride, tetrahydrofuran, toluene and the like.

The invention also comprises the reaction products of the reaction between the multi-functional phenolic compound and the trans-esterification catalyst.

DETAILED DESCRIPTION OF THE PREFERRED EMBODIMENTS OF THE INVENTION

The multi-functional phenolic or carboxylic branching agents useful in reacting with a transesterification catalyst are well known, many of which are set forth in U.S. Pat. Nos. 3,635,895 and 4,001,184 which are incorporated herein by reference. These polyfunctional compounds are aromatic and contain at least three functional groups which are carboxyl, carboxylic anhydrides, phenols, haloformyls or mixtures thereof. Some nonlimiting examples of these polyfunctional aromatic compounds include 1,1,1-tri(4-hydroxyphenyl) ethane, 2,2',5,5'-tetra(4-hydroxyphenyl) hexane, trimellitic anhydride, trimellitic acid, trimellitoyl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred multi-functional phenolic or carboxylic compounds are 1,1,1-tri(4-hydroxyphenyl) ethane, trimellitic anhydride, trimellitic acid or their haloformyl derivatives.

The reaction of the polyfunctional compound with a transesterification catalyst in the method of the invention uses basic type catalysts usually employed in transesterification reactions, for example, oxides, hydrides, hydroxides, carbonates, carboxylates, alkoxides, or amides of the ammonium, alkylammonium, alkali or alkaline earth metals as well as basic metal oxides such as zinc oxides, salts of weak acids such as lithium stearate and organotitanium, organoaluminums and organotins such as tetraoctyltitanate. Because of potential steric hindrance it is preferred to use catalyst with less bulky groups, e.g. the lithium stearate as opposed to the tetraoctyl titanate.

In an embodiment of the present invention, a multi-functional phenolic branching agent, is dissolved in an inert organic solvent, such as tetrahydrofuran, and then a basic trans-esterification catalyst, such as tetraethylammonium acetate hydrate, is added to the solution. The mixture is allowed to react at room temperatures and then the solvent is removed, for example, by evaporation. The resulting waxy solid is ground as finely as possible and is mixed into powdered polycarbonate resin. The resulting mixture is melt blended and extruded to yield a branched polycarbonate which posesses excellent melt strength.

The aromatic polycarbonate polymers branched and used in the invention are well known. The method of preparation of polycarbonates by interfacial polymerization is also well known; see for example the details provided in the U.S. Pat. Nos. 3,028,365; 3,334,154; 3,275,601; 3,915,926; 3,030,331; 3,169,121; 3,027,814; and 4,188,314, all of which are incorporated herein by reference thereto.

In general, the method of interfacial polymerization comprises the reaction of a dihydric phenol with a carbonyl halide (the carbonate precursor).

Although the reaction conditions of the preparative processes may vary, several of the preferred processes typically involve dissolving or dispersing the diphenol reactants in aqueous caustic, adding the resulting mixture to a suitable water immiscible solvent medium and contacting the reactants with the carbonate precursor, such as phosgene, in the presence of a suitable catalyst and under controlled pH conditions. The most commonly used water immiscible solvents include methylene chloride, 1,2-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process for preparing polycarbonate resins of the invention comprises a phosgenation reaction. The temperature at which the phosgenation reaction proceeds may vary from below 0° C., to above 100° C. The phosgenation reaction preferably proceeds at temperatures of from room temperatures (25° C.) to 50° C. Since the reaction is exothermic, the rate of phosgene addition may be used to control the reaction temperature. The amount of phosgene required will generally depend upon the amount of the dihydric phenol and the amount of any dicarboxylic acid also present. The dihydric phenols employed are known, and the reactive groups are the two phenolic hydroxyl groups. Some of the dihydric phenols are represented by the general formula:

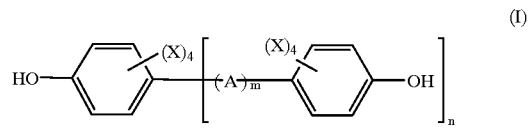

(I)

wherein A is a divalent hydrocarbon radical containing from 1 to about 15 carbon atoms; a substituted divalent hydrocarbon radical containing from 1 to about 15 carbon atoms and substituent groups such as halogen;

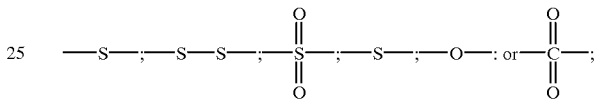

wherein each X is independently selected from the group consisting of hydrogen, halogen, and a monovalent hydrocarbon radical such as an alkyl group of from 1 to about 8 carbon atoms, an aryl group of from 6–18 carbon atoms, an aralkyl group of from 7 to about 14 carbon atoms, an alkaryl group of from 7 to about 14 carbon atoms, an alkoxy group of from 1 to about 8 carbon atoms, or an aryloxy group of from 6 to 18 carbon atoms; and wherein m is zero or 1 and n is an integer of from 0 to 5.

Typical of some of the dihydric phenols that can be employed in the preparation of polycarbonates are bisphenols such as (4-hydroxyphenyl) methane, 2,2-bis(4-hydroxyphenyl)propane (also known as bisphenol-A), 2,2-bis(4-hydroxy-3,5-dibromophenyl)propane; dihydric phenol ethers such as bis(4-hydroxyphenyl) ether, bis(3,5-dichloro-4-hydroxyphenyl) ether; dihydroxydiphenyls such as p,p'-dihydroxydiphenyl, 3,3'-dichloro-4,4'-dihydroxydiphenyl; dihydroxyaryl sulfones such as bis(4-hydroxyphenyl) sulfone, bis(3,5-dimethyl-4-hydroxyphenyl) sulfone, dihydroxybenzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxy-phenyl) sulfide, bis(4-hydroxyphenyl) sulfoxide and bis(3,5-dibromo-4-hydroxyphenyl) sulfoxide. A variety of additional dihydric phenols are available and are disclosed in U.S. Pat. Nos. 2,999,835; 3,028,365 and 3,153,008; all of which are incorporated herein by reference. It is, of course, possible to employ two or more different dihydric phenols or a combination of a dihydric phenol with glycol.

The carbonate precursor can be either a carbonyl halide, a diarylcarbonate or a bishaloformate. The carbonyl halides include carbonyl bromide, carbonyl chloride, and mixtures thereof. The bishaloformates include the bishaloformates of dihydric phenols such as bischloroformates of 2,2-bis(4-hydroxyphenyl) propane, 2,2-bis(4-hydroxy-3,5-dichlorophenyl) propane, hydroquinone, and the like, or bishaloformates of glycols such as bishaloformates of ethylene glycol, and the like. While all of the above carbonate precursors are useful, carbonyl chloride, also known as phosgene, is preferred.

The aromatic polycarbonate polymers include polyester-carbonates, also known as copolyester-polycarbonates, i.e., resins which contain, in addition to recurring polycarbonate chain units of the formula:

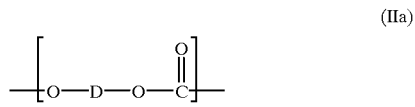

(IIa)

wherein D is a divalent aromatic radical of the dihydric phenol employed in the polymerization reaction, repeating or recurring carboxylate units, for example of the formula:

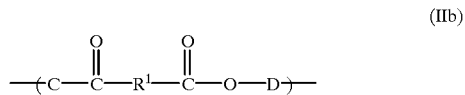

(IIb)

wherein D is as defined above and $R^1$ is as defined below.

The copolyester-polycarbonate resins are also prepared by interfacial polymerization technique, well known to those skilled in the art; see for example the U.S. Pat. Nos. 3,169,121 and 4,487,896.

In general the copolyester-polycarbonate resins are prepared as described above for the preparation of polycarbonate homopolymers, but by the added presence of a dicarboxylic acid (ester precursor) in the water immiscible solvent.

In general, any dicarboxylic acid conventionally used in the preparation of linear polyesters may be utilized in the preparation of the copolyester-carbonate resins of the instant invention. Generally, the dicarboxylic acids which may be utilized include the aliphatic dicarboxylic acids, the aromatic dicarboxylic acids, and the aliphatic-aromatic dicarboxylic acids. These acids are well known and are disclosed for example in U.S. Pat. No. 3,169,121 which is hereby incorporated herein by reference. Representative of such aromatic dicarboxylic acids are those represented by the general formula:

$$HOOC-R^1-COOH \qquad \text{(III)}$$

wherein $R^1$ represents an aromatic radical such as phenylene, naphthylene, biphenylene, substituted phenylene and the like; a divalent aliphatic-aromatic hydrocarbon radical such as an aralkyl or alkaryl radical; or two or more aromatic groups connected through non-aromatic linkages of the formula:

—E— wherein E is a divalent alkylene or alkylidene group. E may also consist of two or more alkylene or alkylidene groups, connected by a non-alkylene or alkylidene group, such as an aromatic linkage, a tertiary amino linkage, an ether linkage, a carbonyl linkage, a silicon-containing linkage, or by a sulfur-containing linkage such as sulfide, sulfoxide, sulfone and the like. In addition, E may be a cycloaliphatic group of five to seven carbon atoms, inclusive, (e.g. cyclopentyl, cyclohexyl), or a cycloalkylidene of five to seven carbon atoms, inclusive, such as cyclohexylidene. E may also be a carbon-free sulfur-containing linkage, such as sulfide, sulfoxide or sulfone; an ether linkage; a carbonyl group; a direct bond; a tertiary nitrogen group; or a silicon-containing linkage such as silane or siloxy. Other groups which E may represent will occur to those skilled in the art. For purposes of the present invention, the aromatic dicarboxylic acids are preferred. Thus, in the preferred aromatic difunctional carboxylic acids, $R^1$ is an aromatic radical such asphenylene, biphenylene, naphthylene, or substituted phenylene. Some non-limiting examples of suitable aromatic dicarboxylic acids which may be used in preparing the poly(ester-carbonate) or polyarylate resins of the instant invention include phthalic acid, isophthalic acid, terephthalic acid, homophthalic acid, o-, m-, and p-phenylenediacetic acid, and the polynuclear aromatic acids such as diphenyl dicarboxylic acid, and isomeric naphthalene dicarboxylic acids. The aromatics may be substituted with Y groups. Y may be an inorganic atom such as chlorine, bromine, fluorine and the like; an organic group such as the nitro group; an organic group such as alkyl; or an oxy group such as alkoxy, it being only necessary that Y be inert to and unaffected by the reactants and the reaction conditions. Particularly useful aromatic dicarboxylic acids are those represented by the general formula:

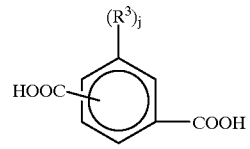

(IV)

wherein j is a positive whole integer having a value of from 0 to 4 inclusive; and each $R^3$ is independently selected from the group consisting of alkyl radicals, preferably lower alkyl (1 to about 6 carbon atoms).

Mixtures of these dicarboxylic acids may be employed. Therefore, where the term dicarboxylic acid is used herein it is to be understood that this term includes mixtures of two or more dicarboxylic acids.

Most preferred as aromatic dicarboxylic acids are isophthalic acid, terephthalic acids, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the dicarboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example instead of using isophthalic acid, terephthalic acid or mixtures thereof, it is possible to employ isophthaloyl dichloride, terephthaloyl dichloride, and mixtures thereof.

The proportions of reactants employed to prepare the copolyester-carbonate resins of the invention will vary in accordance with the proposed use of the product resin. Those skilled in the art are aware of useful proportions, as described in the U.S. patents referred to above. In general, the amount of the ester bonds may be from about 5 to about 90 mole percent, relative to the carbonate bonds. For example, 5 moles of bisphenol A reacting completely with 4 moles of isophthaloyl dichloride and 1 mole of phosgene would give a copolyester-carbonate of 80 mole percent ester bonds.

The preferred polycarbonates for use in the present invention are those derived from bisphenol A and phosgene and having an intrinsic viscosity of 0.3 to 1.0 deciliters per gram measured in methylene chloride at 25° C.

The reaction product obtained upon reaction of the multi-functional phenolic or carboxylic branching agent with a transesterification catalyst is a new branching agent which may be melt blended with a polycarbonate resin as described above in a ratio of from about 0.1 to about 6 mole percent, preferably 3 mole percent, to obtain a branched polycarbonate resin.

In making the new branching agent, if the transesterification catalyst decomposes under the conditions used for redistribution, the equivalents of the transesterification catalyst can be equal to the equivalents of the multi-functional phenolic or carboxylic branching agent. In this context, an equivalent is a mole of compound divided by the number of reactive sites on the compound, e.g., for a compound with one reactive site, the number of equivalents is equal to the number of moles but for a compound with four reactive sites, one mole has four equivalents.

Such a catalyst that would decompose under redistribution conditions is exemplified by a tetralkyl ammonium cation-containing compound. The range for catalysts which decompose and are useful in the present invention is from about 0.1 equivalent percent to 100 equivalent percent of the multi-functional phenolic or carboxylic branching agent.

On the other hand, catalysts which are stable under conditions used for redistribution may be used in levels as low as 0.001 parts by weight of the multi-functional phenolic or carboxylic branching agent and need not be present in more than 0.1 parts by weight of the multi-functional phenolic or carboxylic branching agent.

The production of the branched polycarbonate resins of the invention from the linear polycarbonate resin is done by any of the melt blending operations known for the blending of thermoplastics, such as blending in a kneading machine such as a Banbury mixer. Blending can be done continuously or batchwise.

Preferably the branching and crosslinking is carried out by reacting the reaction product branching agent described above with the aromatic polycarbonate in the melt form in the presence of residual quantities of the trans-esterification catalyst remaining from the preparation of the reaction product of the same catalyst with the multi-functional phenolic compound.

The minimum temperature of the melt extrusion reaction is sufficiently high to create a melt of the reactants. Such a temperature is achieved in an extruder or a molding machine such as an injection or compression molder normally employed for extruding or molding polycarbonate resins. Generally, the melt blending and extrusion are within the temperature range of from about 100° C. to 400° C.

One may also add other types of additives known to the art of plastics compounding. Such additives can include for example fillers (such as clay or talc), reinforcing agents (such as glass fibers), impact modifiers, other resins, antistats, plasticizers, flow promoters and other processing aids, stabilizers, colorants, mold release agents, flame retardants, ultraviolet screening agents, and the like.

The following examples describe the manner and process of making and using the invention and set forth the best mode contemplated by the inventor for carrying out the invention but are not to be construed as limiting the scope of the invention. All parts are by weight. Test results are in accordance with the following test methods.

Where reported, R* may be calculated as follows:
Step 1. Generate viscosity ($\eta^*$) and elastic modulus (G') data on test compositions at three temperatures, with a rotational rheometer such as the RDS 7000, (Rheometrics Inc.).

Step 2. Using the data from STEP 1 fitted to the Arrhenius type equations, calculate optimum melt temperature for parison extrusion (i.e., the temperature required to yield a melt viscosity of 20,000 poise at 100 $sec^{-1}$).

Step 3. Calculate the ratio of viscosity at low shear rate (1 $sec^{-1}$ nominal) to viscosity at 100 $sec^{-1}$ (20,000 poise), R*, at temperature estimated in Step 2. Elastic modulus values (@ 1 $sec^{-1}$) are also calculated at this temperature.

EXAMPLE 1

A quantity of tris(hydroxyphenylethane) was mixed with 0.03 parts per 100 of a heat stabilizer (Irgofus 168) and 250 PPM of tetraethylammonium acetate pentahydrate. The mixture was allowed to stand overnight at room temperature to obtain a novel branching agent of the invention.

EXAMPLE 2

The procedure of Example 1 was repeated except the tetraethylammonium acetate was replaced with 100 PPM of lithium stearate and an additional proportion (0.03) parts of Irgofus 168, to obtain a branching agent of the invention.

EXAMPLE 3

To 100 parts by weight of a polycarbonate resin of R* value 1.47 (General Electric Company, Pittsfield, Mass.) there was mixed separately the branching agents of Examples 1–2 described above. The resulting mixtures were then melt blended in an extruder, extruded and cooled. Test specimens were tested for R* values. The R* values were as follows:

|  | R* |
| --- | --- |
| Example 1 Agent | 1.73 |
| Example 2 Agent | 1.89 |

EXAMPLE 4–10

Repeating the procedure with a polycarbonate resin with an R* value of 1.32 and with varying proportions of THPE, TEAA, lithium stearate and ammonium THPE Salt, branched resins are obtained with the R* shown. The results are shown in the Table, below.

TABLE

| Example | Tris (hydoxyl-phenyl ethane) | Tetra-ethyl-ammonium acetate | Lithium Stearate | Ammonium THPE salt | R* (measurement of melt strength as a result from branching reaction) |
| --- | --- | --- | --- | --- | --- |
| 4 | 0.48 | 0.025 | 0 | 0 | 1.73 |
| 5 | 0.48 | 0 | 0.01 | 0 | 2.3 |
| 6 | 0.48 | 0 | 0.0075 | 0 | 1.88 |
| 7 | 0.48 | 0 | 0.005 | 0 | 2.06 |
| 8 | 0.47 | 0 | 0 | 0.01 | 2.29 |
| 9 | 0.46 | 0 | 0 | 0.02 | 2.04 |
| 10 | 0.47 | 0 | 0 | 0.0075 | 2.38 |

What is claimed is:

1. A method of branching and cross-linking a polycarbonate resin, which comprises;

reacting together a branching site generating proportion of a multi-functional phenolic or carboxylic branching agent and a basic transesterification catalyst in the presence of an inert organic solvent;

removing the solvent to separate a reaction product; and melt blending a mixture of the reaction product with a linear polycarbonate resin.

2. The method of claim 1 wherein the multi-functional phenolic or carboxylic branching agent is selected from the group consisting of 1,1,1-tri(4-hydroxy-phenyl) ethane, 2,2'5,5'-tetra(4-hydroxyphenyl) hexane, trimellitic anhydride, trimellitic acid, trimellitoyl trichloride, 4-chloroformyl phthalic anhydride, pyromellitic acid, pyromellitic dianhydride, mellitic acid, mellitic anhydride, trimesic acid, benzophenonetetracarboxylic acid and benzophenonetetracarboxylic anhydride.

3. The method of claim 1 wherein the catalyst is selected from the group consisting of oxides, hydrides, hydroxides carbonates, carboxylates, alkoxides or amides of the ammonium, alkaliammonium alkali or alkaline earth metals.

4. The method of claim 1 wherein the catalyst is lithium stearate.

5. The method of claim 1 wherein the catalyst is tetraethylammonium acetate.

6. The method of claim 1 wherein the transesterification catalyst does not decompose under the conditions for redistribution and is present in the reaction in a proportion of from 0.001 to about 0.1 part by weight of the multi-functional phenolic branching agent.

7. The method of claim 1 wherein the reaction between the transesterification catalyst and the phenolic branching agent is carried out at room temperature.

8. The method of claim 1 wherein the inert organic solvent is methylene chloride or methanol.

9. The method of claim 1 wherein the product of the reaction between the multi-functional phenolic or carboxylic branching agent and the transesterific-ation catalyst is separated following the reaction from the inert organic solvent.

10. A reaction product produced by reacting together a branching site generating multi-functional plenolic or carboxylic branching agent and a basic transesterification catalyst in an inert inorganic solvent.

11. The product of claim 9.

12. The method of claim 1 wherein the polycarbonate is

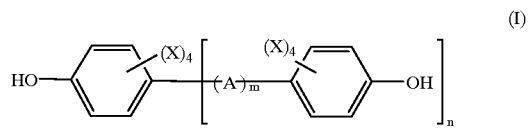

wherein A is selected from the group consisting of a divalent hydrocarbon radical containing from 1 to about 15 carbon atoms, a substituted divalent hydrocarbon radical containing from 1 to about 15 carbon atoms, and substituent groups such as halogen;

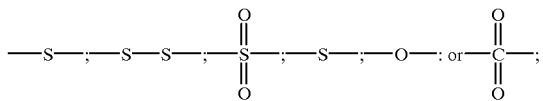

wherein each X is independently selected from the group consisting of hydrogen, halogen, an alkyl group of from 1 to about 8 carbon atoms, an aryl group of from 6–18 carbon atoms, an aralkyl group of from 7 to about 14 carbon atoms, an alkaryl group of from 7 to about 14 carbon atoms, an alkoxy group of from 1 to about 8 carbon atoms, and an aryloxy group of from 6 to 8 carbon atoms;

and wherein m is zero or 1 and n is an integer of from 0 to 5.

13. The method of claim 1 wherein the extrusion is carried out at a temperature of from 100 to 400° C.

14. The method of claim 1 wherein the proportion of the product of the multi-functional phenolic or carboxylic branching agent and the transesterification catalyst added to the linear polycarbonate resin is within the range of from about 0.1 to about 6 mole percent.

15. The product of the method of claim 1.

16. The method of claim 1 wherein the transesterification catalyst decomposes under conditions for redistribution and is present in the reaction in a proportion of from about 0.1 to 100 equivalent percent of the multi-functional phenolic or carboxylic branching agent.

* * * * *